(12) United States Patent　　(10) Patent No.: US 7,756,902 B2
Lin　　(45) Date of Patent: Jul. 13, 2010

(54) AUTO-ID SIMULATOR

(75) Inventor: Tao Lin, Palo Alto, CA (US)

(73) Assignee: SAP Aktiengesellschaft, Walldoft (DE)

( * ) Notice: Subject to any disclaimer, the term of this patent is extended or adjusted under 35 U.S.C. 154(b) by 1172 days.

(21) Appl. No.: 11/024,872

(22) Filed: Dec. 30, 2004

(65) Prior Publication Data

US 2006/0149776 A1　　Jul. 6, 2006

(51) Int. Cl.
　　*G06F 17/30*　　(2006.01)
(52) U.S. Cl. ............... 707/802; 707/803; 360/74.1; 360/137
(58) Field of Classification Search ......... 707/104.1; 360/74.1, 137
　　See application file for complete search history.

(56) References Cited

U.S. PATENT DOCUMENTS

| | | | | |
|---|---|---|---|---|
| 6,996,538 B2* | 2/2006 | Lucas | ........................... | 705/28 |
| 7,161,489 B2* | 1/2007 | Sullivan et al. | ........... | 340/572.4 |
| 2002/0130868 A1* | 9/2002 | Smith | ......................... | 345/440 |
| 2003/0093187 A1* | 5/2003 | Walker | .......................... | 701/1 |
| 2003/0132854 A1* | 7/2003 | Swan et al. | ............ | 340/825.49 |
| 2003/0227392 A1* | 12/2003 | Ebert et al. | ............ | 340/825.49 |
| 2004/0078219 A1* | 4/2004 | Kaylor et al. | .................. | 705/2 |
| 2004/0179510 A1* | 9/2004 | Kuffner et al. | .............. | 370/350 |
| 2004/0181461 A1* | 9/2004 | Raiyani et al. | ................ | 705/26 |
| 2005/0055242 A1* | 3/2005 | Bello et al. | .................... | 705/2 |
| 2005/0092825 A1* | 5/2005 | Cox et al. | .................... | 235/375 |
| 2006/0082444 A1* | 4/2006 | Sweeney et al. | ........... | 340/10.3 |
| 2007/0112574 A1* | 5/2007 | Greene | .......................... | 705/1 |

* cited by examiner

*Primary Examiner*—Don Wong
*Assistant Examiner*—Shyue Jiunn Hwa
(74) *Attorney, Agent, or Firm*—Fish & Richardson P.C.

(57) ABSTRACT

An auto-identification system is described that includes a plurality of distributed auto-id nodes that are operable to track physical objects as they move through an operation of an enterprise, such as, for example, a supply chain network or a sales network. The auto-id nodes are distributed across sites of the network, and are in communication with enterprise application systems and/or data acquisition systems such as RFID readers or sensor devices. By focusing on their respective sites, the auto-id nodes minimize the amount of data tracked by their respective enterprise applications. Further, a simulator may be associated with one or more of the auto-id nodes. In this case, the simulator may project certain movements of the physical objects through an environment of an auto-id node, and then feed corresponding data to the auto-id node. In this way, the auto-id node may be tested and optimized, without requiring actual, physical testing.

16 Claims, 9 Drawing Sheets

AUTO-ID SIMULATOR

TECHNICAL FIELD

This description relates to automatic identification of physical objects.

BACKGROUND

Auto-identification (auto-id) systems are used, for example, to identify or otherwise obtain information about products that are to be manufactured, bought or sold, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical objects, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many other types of auto-id system devices exist. Examples include 2D bar code scanners, smart card devices/readers, voice recognition systems, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY

According to one general aspect, a system includes a physical object movement graph database that is operable to provide a movement graph, the movement graph characterizing movements of a physical object among a plurality of data reading points that are associated with an item tracking system, and a generator that is operable to generate movement data corresponding to the movements of the physical object, for input to the item tracking system.

Implementations may include one or more of the following features. For example, the movement graph may be associated with an identifier of the physical object.

The movement graph may characterize the movements of the physical object by associating a probability that the physical object will move from a current data reading point to a destination data reading point. The movement graph also may characterize the movements of the physical object by associating a window of time required for the physical object to move from the current data reading point to the destination data reading point. The generator may generate the movement data based on the probability and the window of time, and/or on a randomly-selected time within the window of time.

The generator may generate the movement data based on a volume of the physical object that moves among the data reading points within a period of time. The system may include a user interface that may be operable to receive an identifier of the physical object and the volume of the physical object.

The system may include a physical object status database operable to provide a current status or location of the physical object with respect to the data reading points, wherein the generator may be operable to generate the movement data based on the current status or location. The data reading points may be each associated with an auto-identification device. The generator may be operable to generate the movement data as an event message having a format that is compatible with the item tracking system.

According to another general aspect, an object identifier and a volume indicator are received, where the volume indicator characterizes a volume of the object moving between a plurality of auto-identification data reading points that are associated with an item-tracking system. A movement graph is accessed, based on the object identifier and the volume indicator, where the movement graph characterizes movements of the object among the data reading points, and movement data corresponding to the movements of the physical object are generated for input to the item tracking system.

Implementations may include one or more of the following features. For example, accessing the movement graph may include accessing a probability that the object will move from a current data reading point to a destination data reading point, or associating a window of time required for the object to move from the current data reading point to the destination data reading point.

Generating the movement data may include generating the movement data based on the probability and the window of time, or based on a current status or location of the physical object with respect to the data reading points.

According to another general aspect, an apparatus has a storage medium with instructions stored thereon, and the instructions include a first code segment for associating each of a plurality of hypothetical movements of a physical object between a plurality of data reading points with a probability that the associated hypothetical movement will occur, and a second code segment for generating movement data that simulates events that would be generated at the data reading points, if the hypothetical movements were actual movements.

Implementations may include one or more of the following features. For example, the first code segment may include a third code segment for associating each of the plurality of hypothetical movements with a range of time that corresponds to the associated hypothetical movements.

The second code segment may include a third code segment for generating the movement data based on a hypothetical volume of units of the physical object moving between the data reading points, or may include a third code segment for generating the movement data based on a current status or location of the physical object with respect to the data reading points.

The details of one or more implementations are set forth in the accompanying drawings and the description below. Other features will be apparent from the description and drawings, and from the claims.

DETAILED DESCRIPTION

Figure 1:
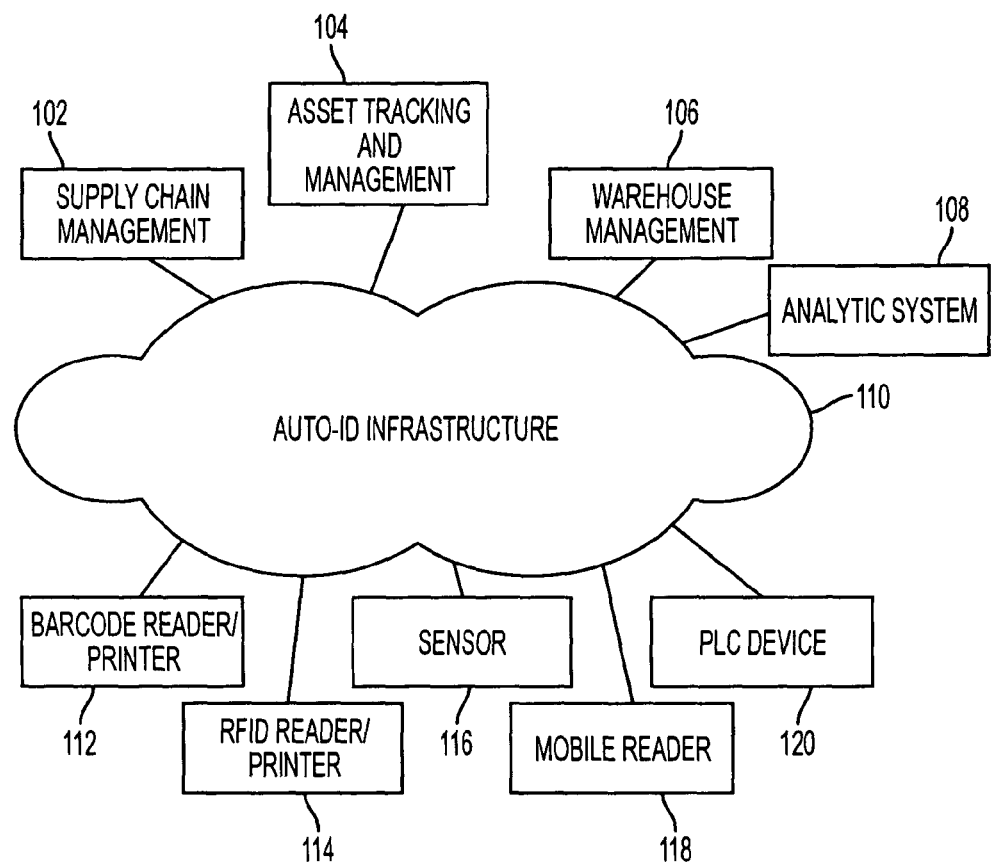
FIG. 1 is a network diagram of an auto-id system.

FIG. 1 is a network diagram of an auto-id system 100. In FIG. 1, a plurality of enterprise applications include, as examples, a supply chain management application 102, which may be used by the enterprise to oversee the process of producing/buying, shipping, and selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, or reasons for delivery delay), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programable Logic Controller (PLC) device represents a digital controller used for applications such as on/off control, timing, logic, counting and sequencing, and also may be controlled by a device controller system, described in more detail below.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
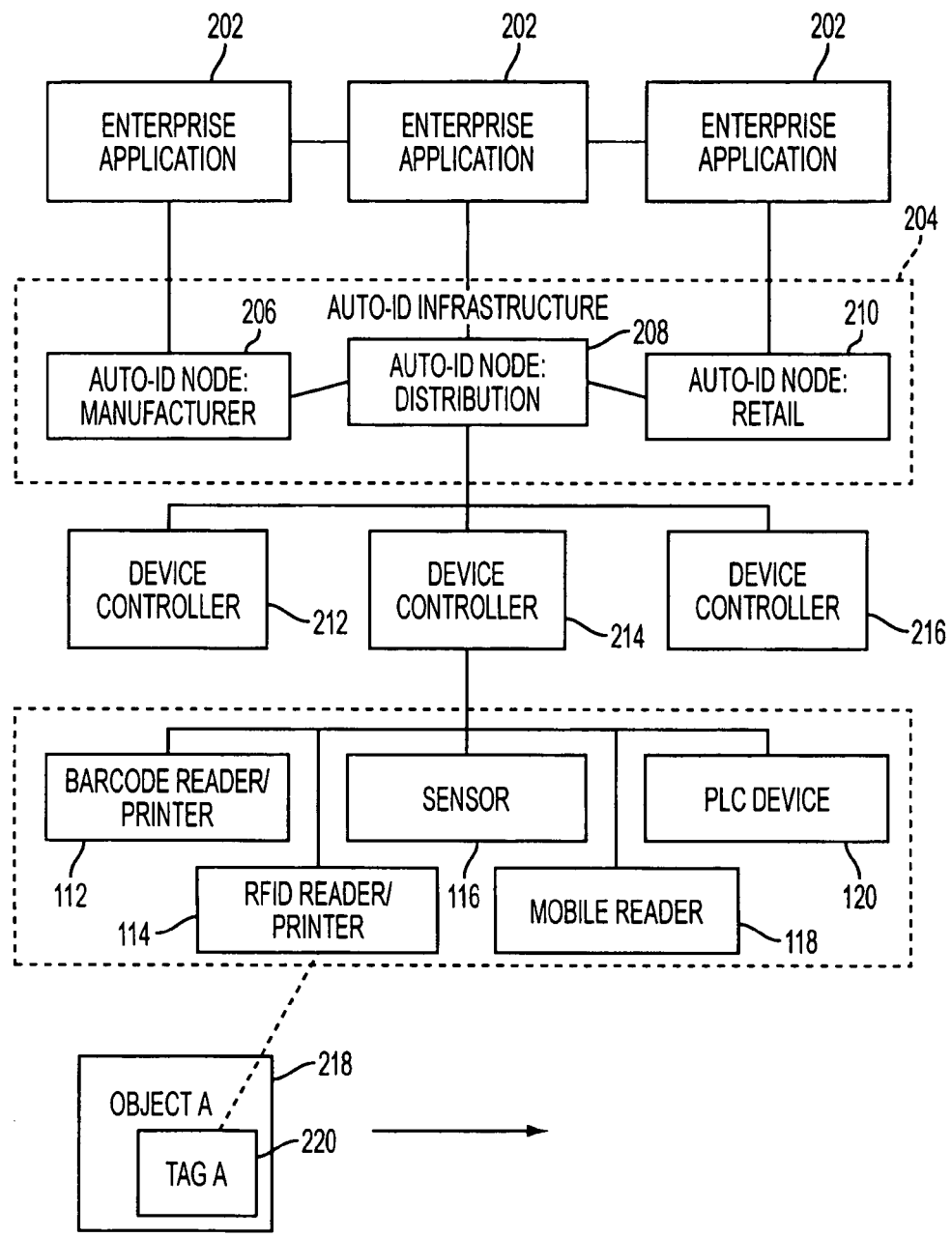
FIG. 2 is a block diagram of a system illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or all of the middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s), and information for multiple objects that has been collected and combined for a desired purpose.

The auto-id nodes 206, 208, and 210 may be strategically placed throughout the enterprise, or across multiple enterprises. For example, the auto-id node 206 may be located at a manufacturing site, while the auto-id node 208 may be located at a product distribution site, and the auto-id node 210 may be located at a retail store. In this way, information that is particular to an actual setting of an auto-id node may be obtained and retained only at that particular node.

For example, the auto-id node 210 at a retail store may be interested in tracking a retail price of an item, or a number of items on a shelf of the retail store. Such information may not be useful to the auto-id node 206 at a manufacturing location, but may be partially useful to the auto-id node 208 at the distribution location. For example, the auto-id node at the distribution location 208 may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantify of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middlware that are common to all of the enterprise applications.

Figure 3:
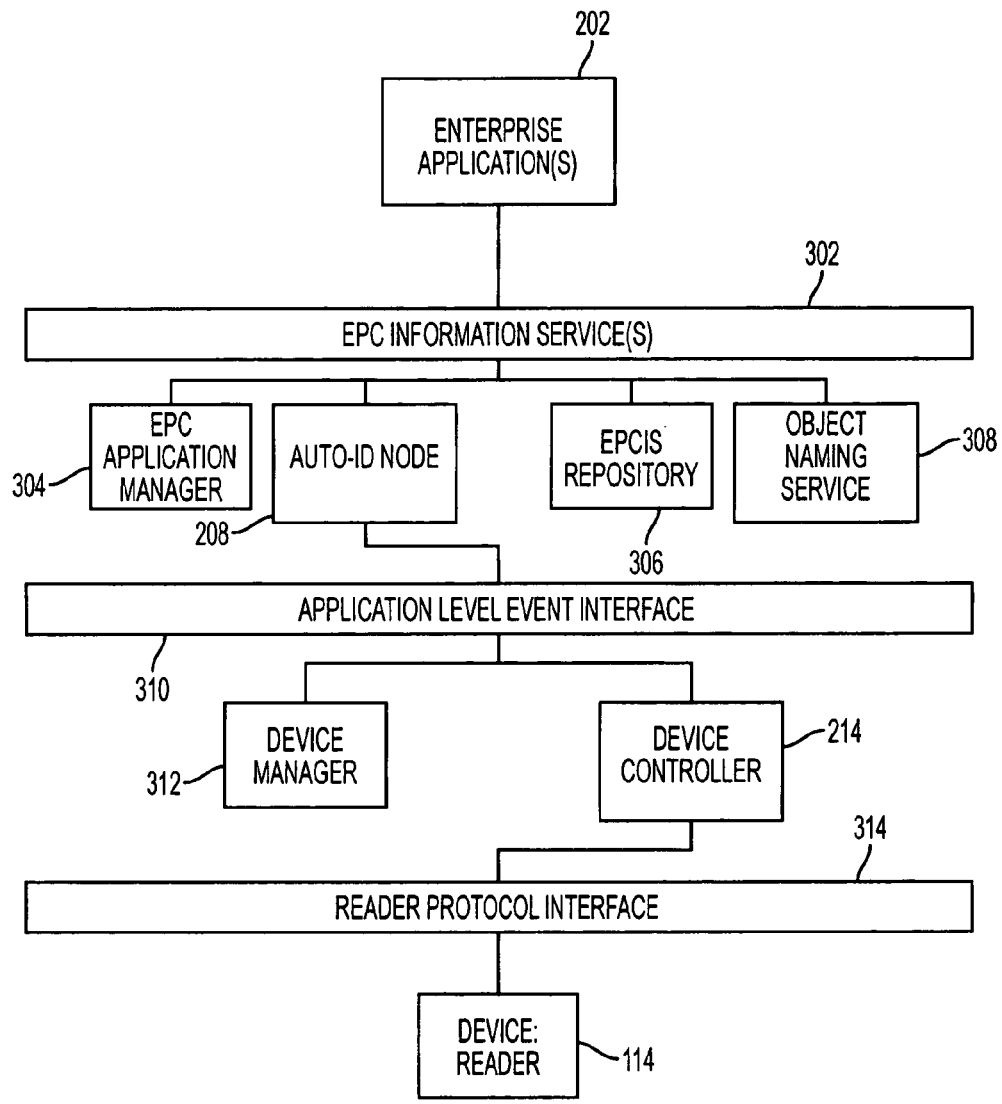
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme which multiple organizations and enterprises have agreed to use in uniquely designating and identifying their respective products, goods, or services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
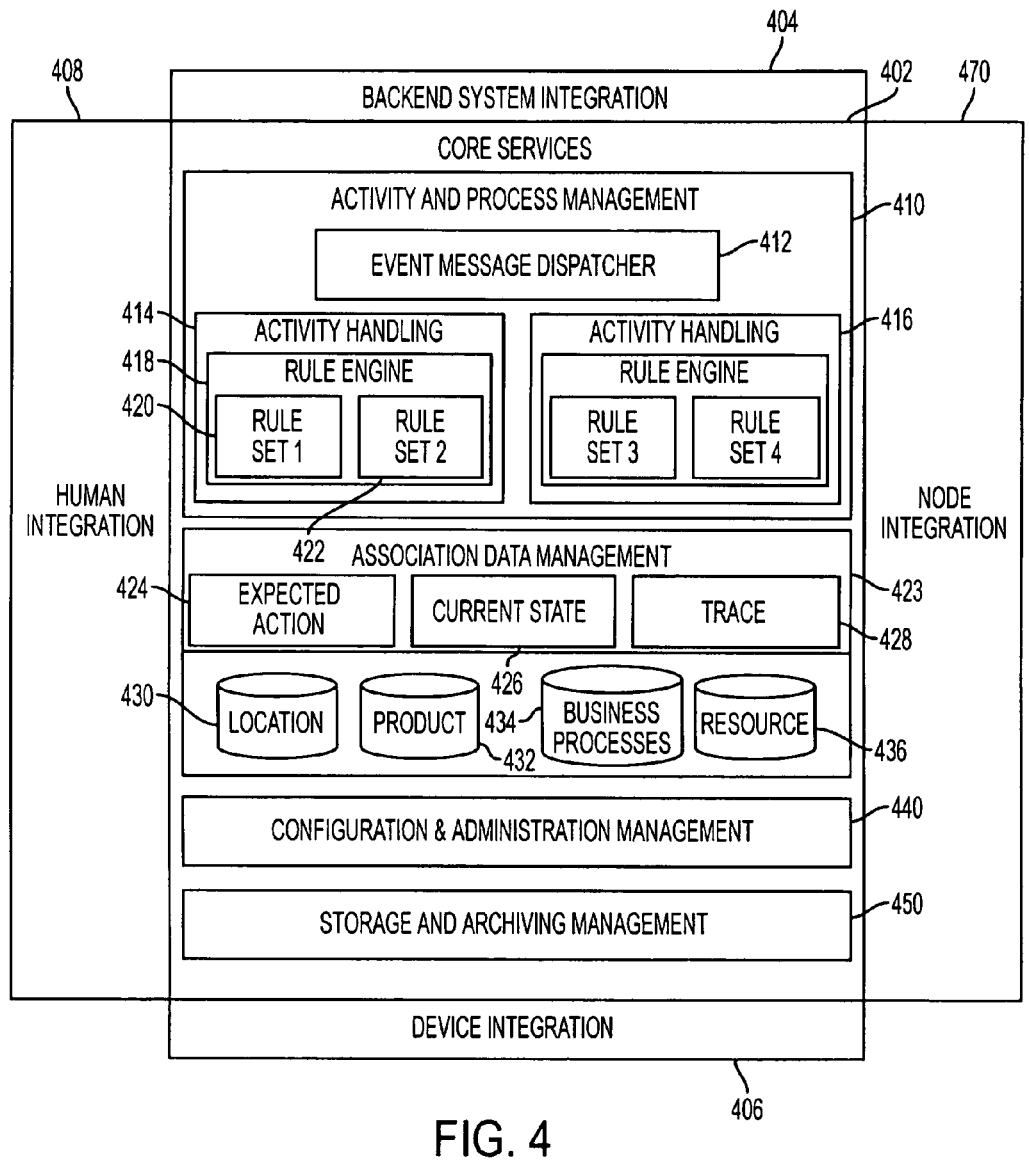
FIG. 4 is a block diagram of the auto-id node(s) of FIGS. 2 and 3.

FIG. 4 is a block diagram of the auto-id node(s) 206, 208, and 210 of FIGS. 2 and/or 3. In FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2. In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make a determination regarding a status of the tracked object(s). In this way, the auto-id node 400 is able to move an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated an object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23 AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414/416 based on the type of the event, (e.g., a device reader event, or a neighboring auto-id node event, or a backend system event), the time of the event (e.g., whether the event is a day time event or a night time event), or virtually any other criteria by which the activity handlers may be delegated to handle the events.

The activity handler 414/416 analyzes the information about an event contained therein, along with any known data that may be associated with the event and accessed when needed, and compares this information with a determined business process(es) associated with the object of the event.

In so doing, the activity handler 414/416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414/416 also may update its own status and/or tracking data with respect to the object, in order to reflect the changes represented by the event(s), and to more accurately reflect where the object stands in the business process.

The business process that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a night-time shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed.

The rule set 420 may, for example, be assigned to the activity handler 414/416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414,416 to keep track of the life cycle of each event object, or a portion thereof, and may update the status of the event objects in real-time, in response to receiving event. For example, the association data management module 423 may include data about the object as it progresses through its lifecycle from, e.g., manufacturing to retail sale, or from a return of the object until the object is re-packaged for retail sale as a refurbished object.

The association data management module 423 generally tracks two classes of data regarding a particular object(s). Specifically, dynamic data refers to data that is changing in time, or that may be expected to change, or that has changed as the associated object moves through time. Conversely, static refers to data that generally is not changing in time, or that is changing only infrequently. Different parameters may be considered to by dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414,416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that are not generally expected to be required to update on a regular or continuous basis. Rather, the association and data management module 423 may communicate with outside sources to update the static data on a periodic or semi-periodic basis. Accordingly, such static data may not generally be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object was made). In general, though, the static information will be considered not to change on an event-by-event basis.

Similarly, a product database 432 may include detailed descriptions of the products or objects that are being trackfed, including such descriptions that change, but that, again, do not generally change on an event-by-event basis. The product database 432 may store such information, or may look up the information from an outside source, using, for example, a universal product id (e.g. the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model(s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse.

Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420,422, manage the integration logic with respect to modules 404-408, or establish connections with outside services (e.g., to update the static data storage 430-436). Finally in FIG. 4, a storage and archiving management module 450 manages the data storage and archiving of the core services module 410. For example, the module 450 may be used to archive data that is used infrequently, or that has not been used for some pre-determined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Figure 5:
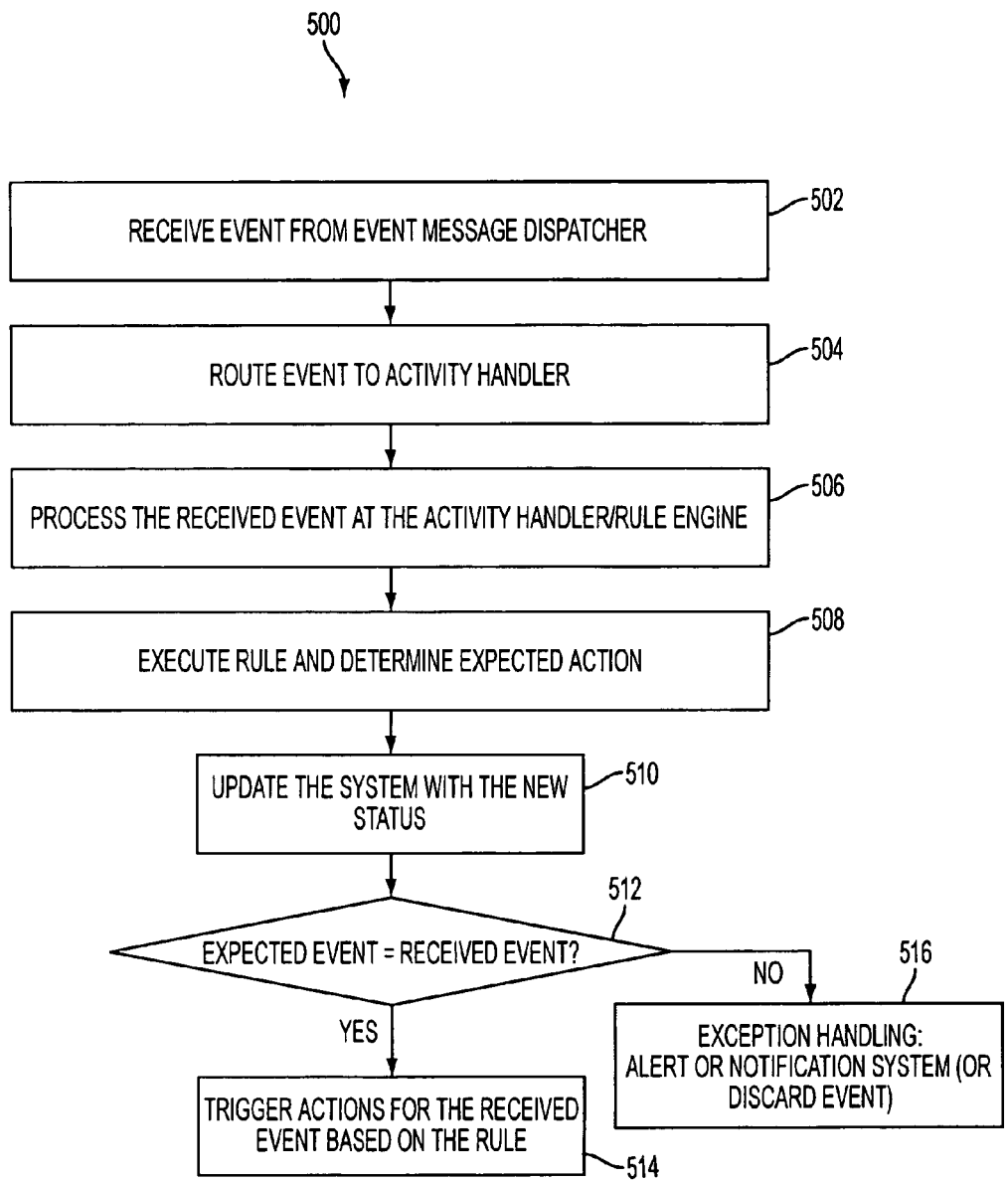
FIG. 5 is a flowchart illustrating a process of the auto-id node of FIGS. 2-4.

FIG. 5 is a flowchart illustrating a process 500 of the auto-id node of FIGS. 2-4, in which an auto-id node processes an event. In FIG. 5, initially, the event message dispatcher 412 receives an event (502) from one of the tracking devices 112-120, or from some other event-generating device. For example, a pallet of soda may arrive at a warehouse of a large retail store and be scanned by the RFID reader 114. An event is then generated that reflects an identify of the object (in this case, the pallet itself, and/or each individual can of soda) in the form of a data packet that is sent to the event message dispatcher 412.

The event message dispatcher 412 then uses information contained within, and/or associated with, the event to find an appropriate activity handler for the event (504). For example, the event message dispatcher 412 may determine that the activity handler 414 handles "receiving" types of events for pallets of soda. The event message dispatcher 412 thus passes the received event to the found activity handler.

The activity handler 414 receives the dispatched event and handles the event with the selected rules, e.g., the rule engine 418 and the rule set 420 (506). Specifically, the rule engine 418 analyzes the information of the event and the associated object so as to find, if any, appropriate rule sets that apply to the received event.

The rule engine 414 then execute the rule(s) 420 for the event, in order to determine the expected actions that should be taken in response to the received event (508). For example, continuing the above example, the rule set 420 may include rules for whether the shipment of soda is to be accepted at the specific warehouse, for stocking therein, or (if, for example, the specific warehouse is already fully stocked with soda) rejected and forwarded to another warehouse that may be short in its soda inventory. To name another example, the reception of the pallet of soda (or some other event) may trigger an end of a business process (at least for the discernable future, or as far as the particular auto-id node 400 is concerned with respect to the object).

The activity handler 414 then updates the auto-id system with the new status of the event (510). For example, a new location of the received object may be updated in both the location database 430 and the product database 432. Also, the business process status for the event may be updated in the expected action 424, current state 426 and history 428. For example, the expected action 424 may be updated with the newly calculated "expected action" from the rule engine 418, and the current state 426 may be updated with the "object received" event as the new current state, and previous state of the object (e.g., "in transit") may be put into the history 428.

The activity handler 418 then determines whether the received event may be matched with a future, expected action (512). If so, the activity handler completes handling the event/action by communicating the event to the related enterprise system, which may trigger more actions/processing in the enterprise system (514).

For example, the activity handler 414 may analyze the expected action 424 for the received object, and may then various criteria to determine whether future action should be taken, e.g., the rule set 420 may determine that: if the expected action for the object includes a stocking action, and if a location matches the received object's location, and if the current time stamp is within a valid time range of the event, and if the receiving warehouse is below expectations for a stocked quantity of soda, then the pallet of soda may be moved through the warehouse and stocked on the appropriate shelf. Of course, there may be more or less criteria than in the above example that is used to compare whether a received event may be matched with an expected action.

Furthermore, there may be one or more expected actions for the received event, in which case, for example, the activity handler 414 may loop through the list of expected actions until an expected action is found or the complete list is checked. For example, if the object is in transit to a final destination, there may be more than one possible transit locations for the shipment. Receiving the object in any one of the transit locations is a qualified as a match to an expected action. As another example, the "received shipment" event may be communicated to a warehouse management system, so that the warehouse system may then update its inventory record, and, additionally or alternatively, the "received shipment" event may be communicated to the manufacture's management system, so that a status of the object may be changed to "shipped."

When the activity handler 418 fails to find an expected action that could match the received event, the activity handler may treat the received event as unexpected or an exception (516). The activity handler 414 may then, for example, send an alert to a user interface of a local operator, notifying the local operator of the unexpected action, or may trigger another exception handling system to report the unexpected action. On the other hand, if the event is also received by other activity handlers, then the activity handler 414 may determine that it is possible that the other handler(s) are responsible for processing the event(s), and may not issue an alarm.

As just described, the activity handler 414 and the rule engine 416 thus serve at least two primary and overlapping functions. First, they determine whether a received event matches an expected action, i.e., whether the event that just happened was supposed (expected) to happen. Second, if the event was supposed to happen, then the rule engine 416 determines whether any further action is supposed to take place in response to the expected action, and, if so, triggers the further action accordingly (or, alternatively, triggers an error alert).

Figure 6:
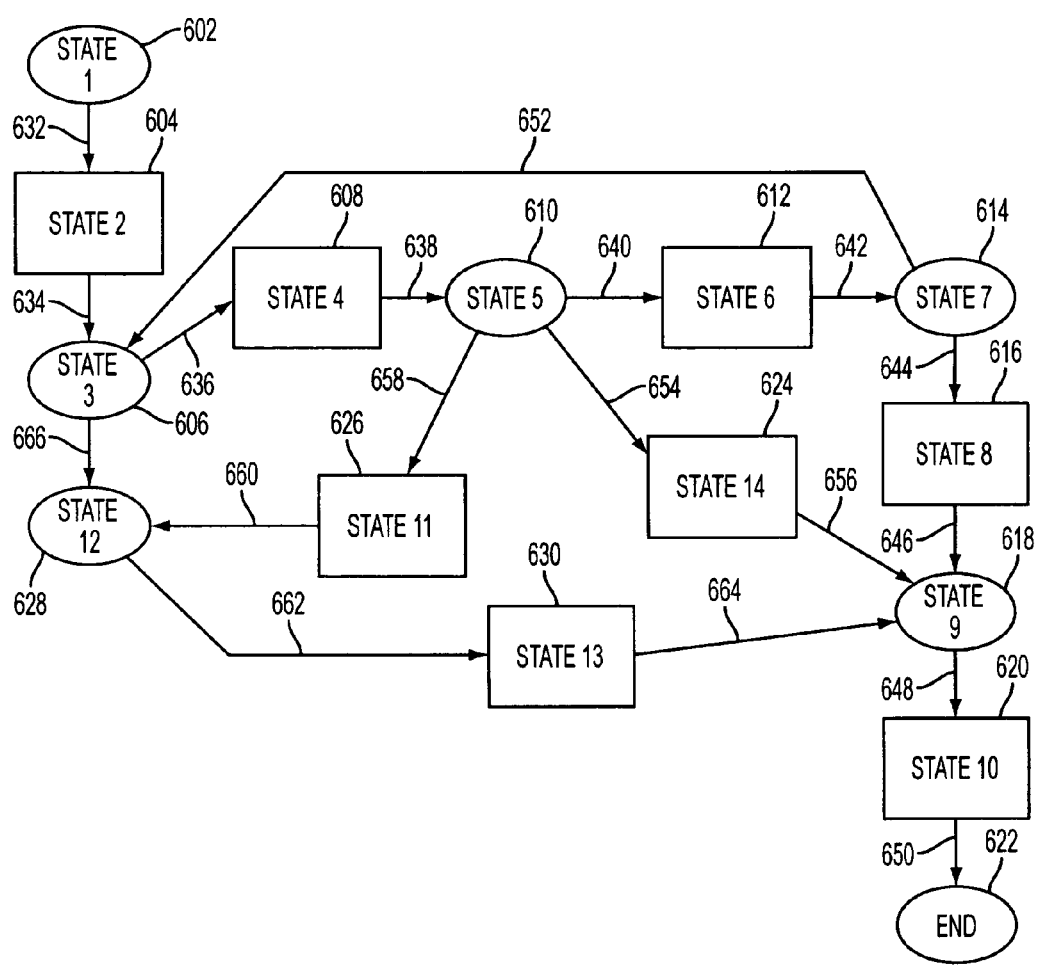
FIG. 6 is a block diagram of a business process model used in the process of FIG. 5.

FIG. 6 is a block diagram of a business process model 600 used in the process of FIG. 5 and associated with a physical object. As referenced above, the business process model 600 includes a sequence of states of an object and the event(s) that triggers any changes from one state to the next.

In FIG. 6, elements 602-630 represent a state that an object is in, or has been in at some point in the past, or may be in at some future time. More specifically, each rectangle-shaped element may represent a state that is part of a business process that is associated with the object, and/or with a lifecycle (or portion thereof) of the object. For example, "state 4" 608 may represent a state of "object in transit." Oval-shaped objects represent states for which the business process model contemplates that there may be multiple possibilities for events following therefrom, where such events are represented by multiple ones of transitional arrows 632-666 that links the various states 602-630.

As a result, FIG. 6 conceptually illustrates the features discussed above with respect to FIGS. 4 and 5, as to how the activity handlers 414/416 manage an object through multiple points along its timeline, and achieve the referenced functionality of first matching an event with an expected action, and then determining which future events should be triggered thereafter.

For example, the state 608 may represent a state of "in transit," so that the state 608 represents a current state 426 of the relevant object, and the event 638 represents an expected event of reading an RFID tag of the object at a reader located at a destination warehouse, while the state 610 represents an expected state of "at warehouse." Thus, if the activity handler 414 receives the event 638 at some point after the object has entered the state 608 "in transit," then the activity handler may use the appropriate rule engine/rule set to determine that the event 638 matches the expected action (event) of transporting the object to a specified warehouse. The rules in the rule set 620 may make such a determination based on, for example, a location of the relevant reader from which the event was generated, or a timing of the event, or an identify of the object itself.

Assuming the event matches the expected event (if not, an alarm may be triggered, or a decision to take not action may be made), then the activity handler switches a current state of the object to the state 610, and switches the state 608 to a history, or past, state. The activity handler then determines which of the possible, expected events 640, 654, and 658 should be experienced by object next.

Or, in other implementations, an operator may determine which state 612, 624, or 626 will be experienced next, and then the activity handler may simply wait for one of the events 640, 654, or 658 to actually happen, and then select one of the states 612, 624, or 626, accordingly. In still other implementations, the operator may notify the activity handler 414 which of the states 612, 624, or 626 is to be expected, so that the activity handler 414 can determine when the corresponding event occurs.

It should be evident from FIG. 6 that there are many possible routes or timelines that a particular object may follow through the business process model 600, depending on, for example, how the rules are implemented. Further, an object's progression along a particular route may depend on its route to date, and also may depend on one or more future possible routes (states). As a result, by adding, removing, or modifying the rule sets 420 and 422, a route or lifecycle of an object may easily be managed in a number of situations and scenarios.

For example, FIG. 6 may represent a lifecycle for a package of meat or other agricultural product that is being shipped from a farm to a retail grocery store. The state 610 may represent a state of "at warehouse A," while the states of 612, 624, and 626 may represent states of "receiving facility in country A," "receiving facility in country B," and "receiving facility in country C."

The rules may be consulted to determine which of the states 612, 624, or 626 are possible, so that, for example, a corresponding event 640, 654, or 658 may be expected to be received. For example, agricultural restrictions may apply in some countries regarding limitations on importing meat or other agricultural products. As a result, if the activity handler 414 determines at the state 610 that the meat shipment originated from country Z in state 602, then this determination may apply a rule which restricts shipment into countries A and B (i.e., which limits a future action to the state 626, so that the event 658 becomes an expected event at a related auto-id node. Similar comments apply to rules which may be based on "future" states, such as a final destination state (e.g., retail grocery store) 622.

It should be understood that such rules regarding restrictions of shipments or other events/states may be dynamically modified. For example, if agricultural restrictions are lifted by an act of government of a particular country, then the rules may be modified to allow meat shipments to that country where none was previously allowed. However, in so doing, the basic architecture of the business process model and the auto-id node 400 is maintained. Similarly, more rules may be added in the business process for special handling instructions, or other additions/modification to the original business process and lifecycle of the specific product.

It should be understood that such rules may be added locally to an auto-id node, which enables the flexible adjustments of a common business rule to handle specific local business logic. This architecture may help the enterprise system, for example, to apply organization wide policies, while allowing variations at lower levels, e.g., a local auto-id level. This architecture also may help the enterprise system not to be burdened with the detailed management of the low level, local specific business process (represented in the format, for example, of rules or rule sets), even though the enterprise system may, if necessary, obtain information regarding the rule sets or other operations of the auto-id node(s). The architecture also provides an enterprise system with a scalable platform for growing the business process.

As another example of the flexibility of the architecture of the auto-id node of FIG. 4, it should be understood that the architecture allows for specific, time-limited application of desired rules, within the overall context of a business process. For example, in the example referenced above regarding a Christmas display during Christmas season, the rule set 422 may be uploaded to an auto-id node in a retail store's Christmas display that includes objects for sale.

The rule set may include a rule 422 that when the contents (objects) of the display drop below some selected amount, then additional units of the object should automatically be re-order from a particular manufacturer. After Christmas, this rule may be deactivated, or be replaced by a new rule that specifies a different inventory level to trigger a new order.

In the architecture of the activity and process management module 410, then, each removal of an object from the display may trigger an event from an associated RFID reader, and the event may be matched with an inventory activity handler, having the rule(s) associated with that reader. The rules then compare the remaining inventory with the "trigger" amount of inventory, and, when the "expected event" of less than the specified level of inventory is reached, then the activity handler triggers the order for more of the relevant object(s) of the display.

The architecture of the rule engine allows the rule updates to happen without the disturbance of the auto-id node in processing other events. For example, in a retail system, each promotion or sale event may be represented in a rule set, where new prices for a list of sales object may be determined from the rule(s). In a warehouse management system, seasonal objects' inventory level may be adjusted by applying different rule sets in different times of the year, or in different locations of the warehouse, depending on, for example, a local climate of the warehouse.

It should be understood that the business process model of FIG. 6 is but one representation of a framework for implementing the rules of the activity and process management module 410. Object or device states, and corresponding events, may be formalized according to some other framework, or may be implicit within the rules themselves.

Figure 7:
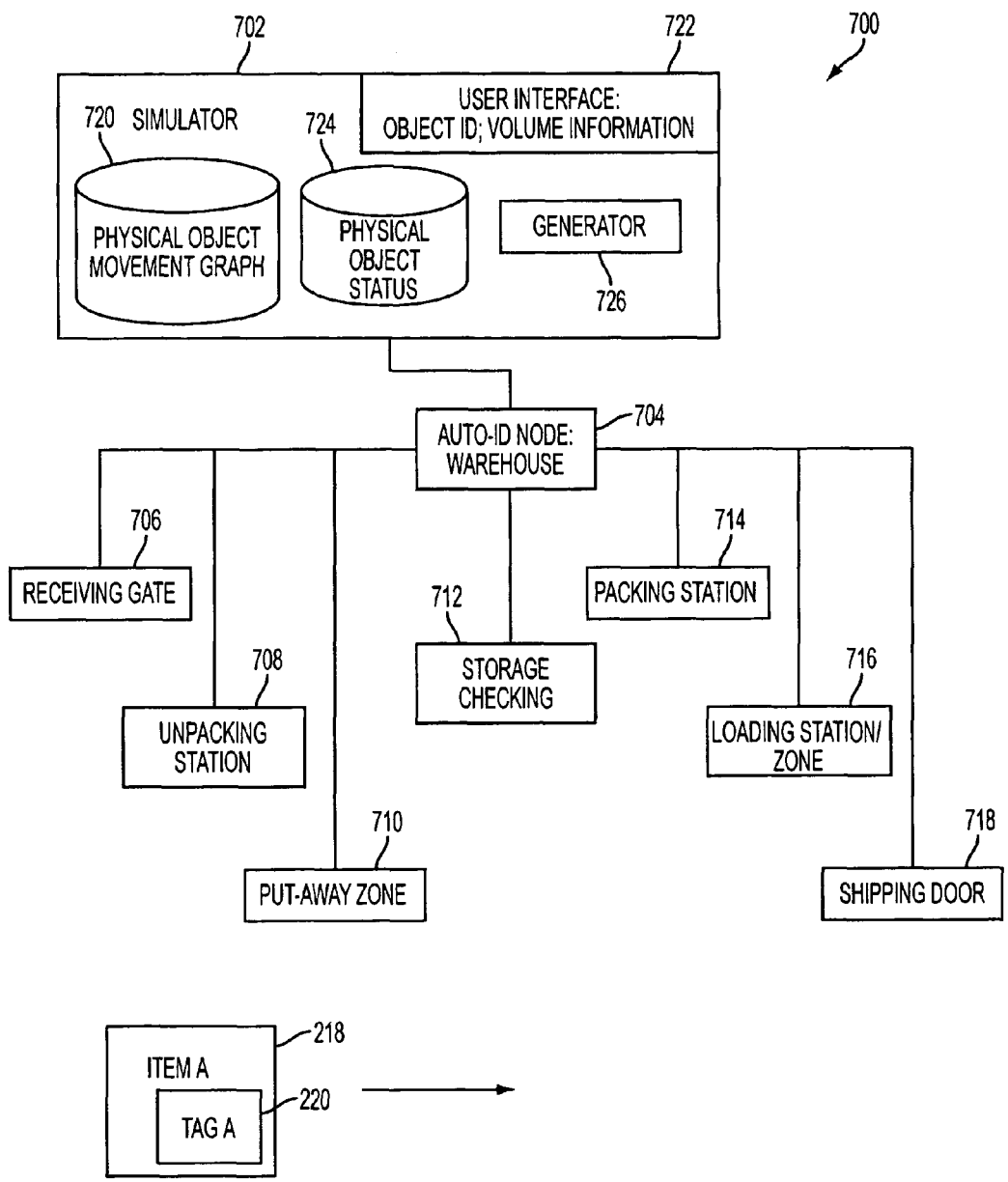
FIG. 7 is a block diagram of a simulation system used with the auto-id systems of FIGS. 1-4.

FIG. 7 is a block diagram of a simulation system 700 used with the auto-id systems of FIGS. 1-4. In FIG. 7, a simulator 702 is used to generate movement data corresponding to movements of one or more physical objects. More particularly, the movement data generally corresponds to known, expected, or potential movements of physical objects through a particular environment (e.g., the manufacturing, distribution, and/or retail environments of FIG. 2) associated with one or more auto-id nodes.

Once generated by the simulator 702, the movement data may be fed into an associated auto-id node, such as an auto-id node 704 associated with a warehouse environment. That is, the movement data corresponds to a movement of a physical object, or type of physical object(s), through a warehouse environment that is monitored and maintained by the auto-id node 704.

The warehouse environment, for purposes of this example in this description, generally is intended to receive, handle, store, and/or ship physical objects, as part of, for example, a supply chain. As such, the warehouse environment generally includes a plurality of data reading points 706-718, at which information regarding a physical object is read from, for example, the RFID tag 220 that is associated with the physical object 218 of FIG. 2.

It should be understood from the above description of FIGS. 1-4 that the various data reading points 706-718 of FIG. 7 correspond to, and/or may include, the various device controllers and/or readers of FIGS. 1 to 2. For example, a receiving gate 706 represents a data reading point at which the object 218 is received at the warehouse. The receiving gate 706 may include one or more of the device controllers 212 to 216, and/or one or more of the readers 112-120, such as, for example, the RFID reader 114. As a result, when the object 218 is received at the receiving gate 706, information, including identification information (e.g., an SKU number), is read from the tag 220 in the matter described with respect to FIG. 4. Then, as described with respect to FIG. 4, an event message may be generated at the receiving gate 706, and transmitted to the auto-id node 704.

The object 218 may then be forwarded to one or more of a plurality of remaining data reading points, such as, for example, an unpacking station 708, a put-away zone 710 (where shipments are "put away" in their entirety, without being unpacked), a storage checking facility 712, a packing station 714, a loading station 716, and/or a shipping door 718. Discussion of the functions of the various data reading points 706-718, to the extent not apparent, is provided in more detail below in the context of discussion of the function and operation of the simulator 702.

In general, though, it should be understood that the object 218 may encounter various ones of the data reading point 706-718 as the object 218 moves through the warehouse environment. For example, the object 218 may include a pallet with two cases of retail items. The object 218 may be received at the receiving gate 706, and unpacked in part at the unpacking station 708 to separate the two cases. Then, one case may be forwarded to the loading station 716, while the other is forwarded to the packing station 714 for repacking according to a different packaging scheme (e.g., placed on another pallet with another type of retail goods), before being sent to the loading station 716. Thereafter, both cases may be sent to the shipping door 718 for shipping.

Various techniques for governing these and similar movements of the physical object 218 through the warehouse environment should be apparent from the discussion above of FIGS. 4-6. For example, a business process model such as the business model 600 of FIG. 6 may govern the movement of the physical object 218, based on, for example an origin or destination of the object 218, inventory requirements of a retail store associated with selling the object 218, or on some other business criteria or business logic.

Also, although the object 218 is illustrated as a single object having a single tag 220, it should be apparent from the above discussion that the object 218 also may represent a plurality of goods that may be packaged together. That is, as in the example just given, the object 218 may represent a pallet of goods that includes individual objects or cases, or other units of the objects.

As a result, and depending on the size of the warehouse environment and a number of the data reading points 706-718, a number of the event messages generated by the data reading points 706-718 and received at the auto-id node 704 may become very large, and, moreover, the number of event messages received at the auto-id node 704 within a given period of time may become very large.

Further, and considering possible distances that may exist between the various data reading points 706-718, particularly within a large warehouse environment, it may be impractical for an operator of the warehouse to test a functionality of the auto-id node 704 with respect to a given type or volume of objects 218 (or groups thereof). Such testing may be particularly difficult when a number of different scenarios exist for routing the objects 218 through the warehouse environment.

Thus, such testing may generally require actual transportation of the relevant volume of actual physical objects through the actual variety of processing scenarios that may exist, including the appropriate levels of human and machine (e.g., transportation equipment) resources that are necessary to implement the various warehousing scenarios. Further, even if such human and machine resources are available, and even if time is available to use these resources for testing purposes, the relevant number and volume of the objects 218 may not be available. For example, in a scenario where the warehouse operator must decide whether to accept a future order from a particular manufacturer for warehousing a certain number of the objects 218, the objects 218 would likely not be available until actually manufactured at the manufacturing site.

Accordingly, the simulator 702 may be used to generate movement data associated with one or more physical objects, types of physical objects, and/or a number of processing scenarios for processing the objects through the warehouse environment. The movement data, for example, may be generated as a simulation model, or testing script, that represents or provides the movement data, perhaps in an event message format that is recognizable by the auto-id node 704. The auto-id node 704 need not be aware that the movement data represents simulated or potential event messages, and may thus process the event messages in the exact same manner as would occur during normal reception of event messages from the data reading point 706-718.

As a result, an operator of the auto-id node 704 may be confident that, to the extent that the movement data accurately represents true movement of the physical objects 218 to the warehouse environment, the auto-id node 704 will be capable of processing the type and amount of information resulting from actual implementation of the simulated processing techniques. In this way, functionality of the auto-id node 704 may be verified and validated before the time and expense of undertaking a new order are experienced.

Moreover, a functionality of the warehouse may be optimized for cost and efficiency. For example, there may be a large number of packing stations 714 relative to the loading station 716. In this case, it also may be that packing operations associated with packing station 714 are more time consuming than the loading operations associated with the loading station 716. In this case, a number of the objects 218 being packed at the packing station 714 may cause work delays at the loading station 716, while workers at the loading station 716 wait idly for the packing operations at the packing station 714 to be completed. In such scenarios, the simulator 702 may be used to determine an optimal ratio of packing stations 714 to loading stations 716, based on, for example, the number of objects 218 to be packed, the type of packing and/or loading to be performed with respect to the objects 218, or a number of other factors.

In addition to testing the physical limits and capabilities of the auto-id node 704 and the data reading point 706-718 before actual physical deployment thereof, and/or optimization of efficiency in the warehouse environment, the simulator 702 may provide various other advantages. For example, the simulator 702 may allow various analysis of the profitability and other business aspects of the warehouse environment, such as, for example, a return on investment (ROI) analysis of installation of additional data reading points, and/or device controllers or reading devices. As another example, the simulator 702 may allow software testing of software associated with the auto-id node 704. As yet another example, the simulator 702 may be accessed online by an operator, so that the operator may easily test various scenarios for operation of the auto-id node 704.

In generating the movement data, the simulator 702 includes a physical object movement graph 720. Generally speaking, the physical object movement graph 720 provides a business flow or process flow for a particular object or group of objects or type of objects that may move through the warehouse environment, based on the various functions and processing scenarios that may be associated with the warehouse.

For example, the physical object movement graph 720 may contain information for the object 218 that describes possible movement scenarios for the object 218 through the data reading points 706-718. Such movement may be characterized by a number of different parameters and/or criteria.

For example, the movement of the physical object may be defined with respect to an originating or current data reading point, and a number of possible destination reading points. In this case, if the object 218 is at the receiving gate 706, the physical object movement graph 120 may associate certain probabilities or percentages with the physical object 218, in order to define the odds that the physical object 218 will move to a given one of the possible destination data reading points.

For example, if the object 218 is at the receiving gate 706, the physical object movement graph 720 may dictate that there is a 20% chance that the (particular type of) object 218 will move to the unpacking station, and a 80% chance that the object 218 will be moved to the put away zone 710. In other words, the physical object movement graph captures movement information that is expected to occur with respect to the physical object 218, without necessarily regarding or requiring the reasons why such probabilities or percentages exist.

For example, the 20%/80% example just provided may represent a situation where the warehouse is providing 20% of the received objects 218 to a first retail store, and providing 80% of the objects 218 to a second retail store, where the two retail stores have different packing or shipping requirements. It should be understood from the above discussion of FIGS. 4-6 that such information may be captured in the association data management module 423 of FIG. 4, and/or captured within the business process model 600 of FIG. 6. For the purposes of the physical object movement graph 720, however, only the resulting probabilities of movement between the data reading points 706-718 are necessary for the operation of the simulator 702.

A second type of information that may be captured in the physical object movement graph relates to an amount of time generally expected for transportation between the data reading points. For example, it may be that the receiving gate is relatively close to the unpacking station 708, so that a time window for transportation between these two stations is expected to be, for example, five to ten minutes. Meanwhile, the receiving gate 706 may be remotely located from the loading station 716, so that direct transport between these two data reading points may require a longer and more variable time window, for example, 30-40 minutes.

Such timing information may be used in a variety of ways to test the auto-id node 704. For example, if a first shipment of the object 218 is unpacked at the unpacking station 708 and two subsets of the object 218 result, as in the example above, it may be that the first subset is processed through both the storage checking data reading point 712 and the packing station 714, before being transported to the loading station 716. Meanwhile, the second subset of the objects 218 may be transported directly from the unpacking station 708 to the loading station 716.

As a result, the timing information just referenced may be used to determine that a total expected time for the first subset of the object 218 may be significantly more than that of the second subset, so that a loading operation at the loading station 716 may be delayed while an arrival of the delayed subset is awaited. If such delays become problematic in a simulated scenario, then it may be determined in response that the packing station 714 should be relocated closer to the loading station 716, or that some other corrective action should be taken.

As another example, the timing information may be used to determine a variability of a proposed operation. For example, if the simulated time differences for transporting the object 218 through a number of the data reading points 706-718 exceeds an allowed time period for processing the objects 218 within the warehouse, then corrective action may be required. As an example of such corrective action, the data reading points 706-718 may be rearranged to reduce the processing time, or an operation of one or more of the data reading points 706-718 may be eliminated with respect to the object 218.

Also with respect to the amount of time necessary for certain movements to occur within the warehouse environment, the physical object movement graph 720 may track a range of time that may be expected with respect to a particular movement. For example, the physical object 218 may be expected to move from the receiving gate 706 to the unpacking station 708 in 25 minutes, but there may be a range or variation in this time period that may result in the possibility of the movement taking anywhere from 20-30 minutes. Such time variations are discussed in more detail below, with respect to FIG. 8.

Also within the simulator 702, a current status of the physical object 218 may be stored within a physical object status database 724. It should be understood from the discussion of FIGS. 3-4 that some or all of the status information for the physical object 218 may be stored separately from the simulator 702. For example, such information may be stored within the association data management module 423, and/or within the EPCIS repository 306 of FIG. 3.

Generally speaking, then, the physical object status database 724 contains (or accesses) information regarding the object 218 and/or its current status. For example, such status information may include a current location of the physical object 218, an origination point of the object 218, and/or a destination(s) of the object 218. The physical object status data also may include, for example, packing information for the object 218. For example, information may be included as to whether the object 218 is currently part of a pallet or other grouping of objects, or is packed individually.

Various other types of status information may be used. For example, it may be stored that the physical object 218 is fragile and easily breakable, and, therefore, must be processed at a specially-designated unpacking station. Other status information also may be included.

The simulator 702 also includes a user interface end 722, by which a user may specify various parameters to be used by the simulator 702 in generating the movement data. In particular, the user interface 722 may be used to enter an object ID or object type ID. That is, as discussed above, the physical object movement graph 720 may generally store information with respect to particular objects or types of objects. As a result, in order to run a particular simulation, the user must first specify a desired object, to thereby obtain corresponding movement information from the physical object movement graph 720.

Another type of information entered through the user interface 722 includes volume information, which generally refers to an expected number or frequency of the physical objects 218 with respect to a given amount of time. For example, the volume information may specify that 100 pallets of the object 218 are expected at the warehouse every day, or every hour.

A generator 726 accesses information provided by the user interface 722, the physical object status database 724, and/or the physical object movement graph 720, in order to generate a set of movement data for provision to the auto-id node 704. For example, the generator 726 may determine that for a particular object or type of object, and for a particular volume of that object, that a particular physical object movement graph should be selected from the physical object movement graph database 720. Then, based on a current status of the relevant object, as determined from the physical object status database 724, the generator 726 may generate a data set that represents a virtual movement or progression of the object from its current location through appropriate ones of the data reading points 706-718.

For example, in a situation where the physical object 218 includes a number of cases and/or pallets of objects that are currently located at the unpacking station 708, the generator 726 may determine that there are three possible paths that the physical object 218 may follow through the warehouse environment before reaching the shipping door 718, and that there are associated probabilities governing which portion of the physical objects 218 take each one of the through possible paths.

As referenced above, such information is dependent upon the particular volume of the objects 218 that is present or assumed to be present. For example, a small volume of goods may have only the three paths just referenced, while a much larger volume of the goods may be associated with many more paths through the warehouse environment. As explained, such information may be determined from the physical object movement graph that is accessed in the database 720.

The generator 726 thus generates a movement data set or data script that may be fed to the auto-id node 704. As discussed above, the auto-id node 704 may not even be aware that the received data set represents simulated or potential movement, as opposed to actual movement data, and may therefore process the data sets in exactly the same manner as actual movement data would be processed. As a result, an operator of the auto-id node 704 is provided with an accurate representation of the ability and functionality of the auto-id node 704 within the warehouse environment.

Figure 8:
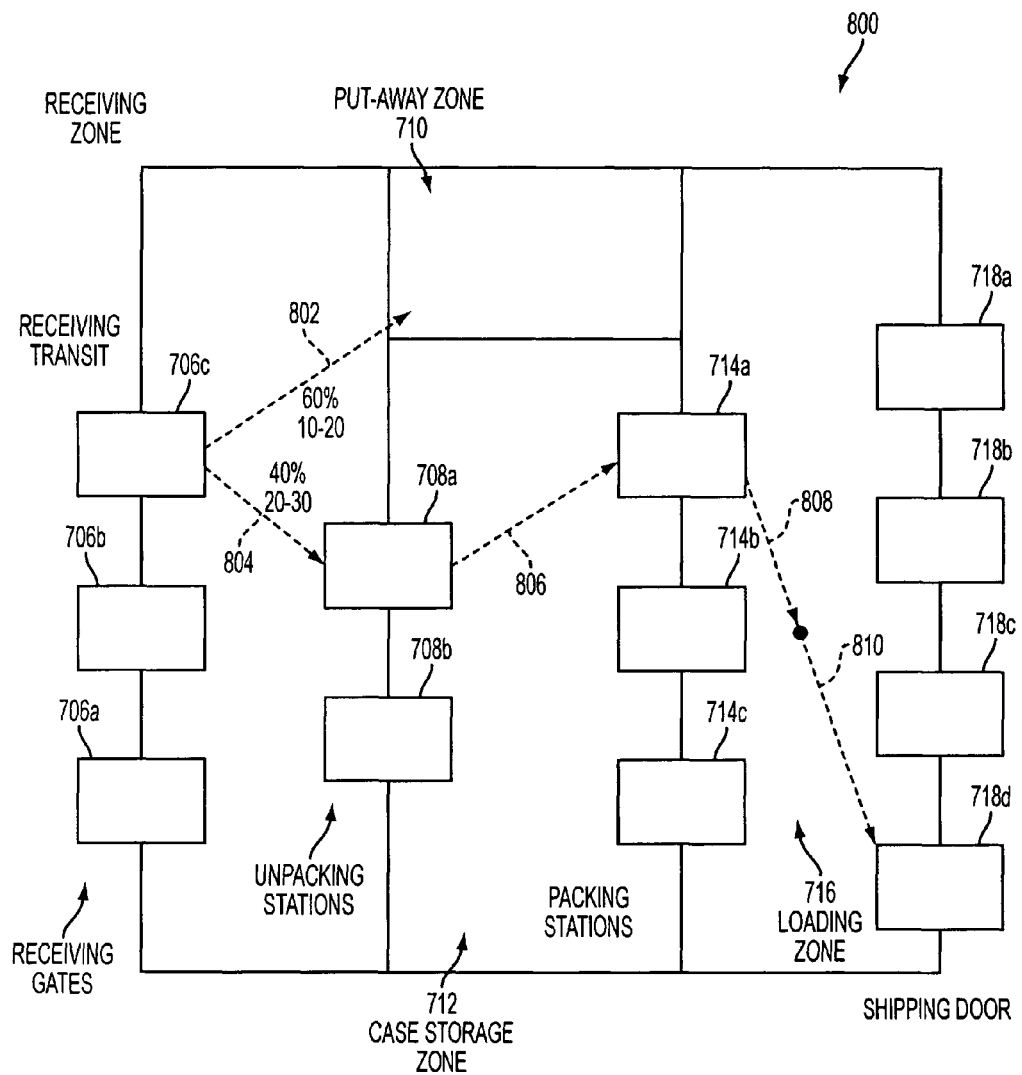
FIG. 8 is a graph illustrating an example of the physical object movement graph of FIG. 7.

FIG. 8 is a graph 800 illustrating an example of the physical object movement graph of FIG. 7. In FIG. 8, and based on the above discussion of FIG. 7, it should be understood that the graph 800 generally represents the possibilities and probabilities of movement of the physical object 218 within the data reading points 706-718. Further, it should be understood that the graph 800 is constructed with respect to particular assumptions regarding a volume (i.e., a number per time period of the physical object 218) to be processed.

Moreover, although FIG. 7 is discussed above in terms of a single one of each of the plurality of data reading points 706-718, it should be understood that such discussion is provided for the sake of clarity and simplicity. Within an actual warehouse environment, of course, there may be many ones of the receiving gate 706, or of any one of the plurality of data reading points 706-718, or of other data reading points.

Also, a particular data reading point, such as, for example, the put-away zone 710, may be associated with a general area (and multiple readers), rather than with a single reading location, such as may be more likely to occur at a particular receiving gate (of course, there may be multiple readers at a particular receiving gate, as well). As a result, FIG. 8 generally illustrates a plurality of the data reading points 706-718, differentiated by additional labels "a," "b," "c," or "d," although the data reading points, as a group, may be referred to by the single numeral(s) 706-718.

Thus, in FIG. 8, the object 218 may be transported between any two of the data reading points 706-718. For example, a dotted line 802 indicates that there is a 60% probability that the physical object 218 at the receiving gate 706c may be moved to the put-away zone 710, and that such a movement may take a time period designated to be within a window of 10 to 20 minutes. Similarly, the graph 800 indicates at dotted line 804 that there is a 40% chance that the physical object 218 at the receiving gate 706c will be moved to the unpacking station 708a, and that such movement is expected to take within between 20 to 30 minutes.

Although not explicitly illustrated in FIG. 8, except to the extent discussed below, it should be understood that remaining data reading points of the graph 800 may be typically be filled in with dotted lines similar to lines 802 and 804, or other suitable indicators for representing probability percentages describing a movement of the physical object 218 between any two data reading points 706-718, and with an associated time window for such movement.

In a simple example, then, a user may access the user interface 722 to indicate an object identifier associated with the physical object 218, and a volume information of 100 units of the physical object 218 (in a given time frame). This scenario may result in a determination by the simulator 702 (using the physical object status database 724) that the physical object 218 is presently located at the receiving gate 706. The simulator 702 may then access the graph 800 from the physical object movement graph database 720, based on the object identifier and the volume information.

Then, the generator 726 may generate data script in which 40 of the 100 units of the physical object 218 are considered to have moved from the receiving gate 706c to the unpacking station 708a, where each of these 40 units are considered to have taken a randomly determined time between 20 to 30 minutes to complete such movements. Similarly, the generator 726 will include event message information within the data script indicating that 60 units of the 100 physical objects 218 move from the receiving gate 706c to the put-away zone 710, and that each of these 60 movements takes some randomly-determined amount of time between 10 to 20 minutes.

Similar comments would apply at each movement of each of the 100 units of the physical object 218 through the various data reading points 706-718. For example, once one of the 60 units of the physical object 218 that travels to the put-away zone 710 is registered as located at the put-away zone 710, a corresponding percentage and time frame will be determined for dictating how many of the 60 units are advanced to one of the remaining data reading points 712 to 718.

As a result, it may be understood that all 100 of the units of the physical object 218 each effectively correspond to a time line of movement(s), defined by corresponding movements between the data reading points 706-718. For example, a first one of the units of the physical object 218 may be among the 40 that progresses to the unpacking station 708a, and may then progress to the packing station 714a (indicated by the dotted line 806), into the loading zone 716 (indicated by the dotted line 808), and onto the shipping door 718d (indicated by the dotted line 810). In particular, this unit may experience the low end of the time frame (i.e., 20 minutes, or corresponding number) during its movements, while a second one of the units of the physical object 218 may experience a number toward the high end of the defined time range, even between the same two data reading points, or between a same sequence of data reading points.

This example illustrates the point that even two identical objects traveling in identical paths may experience wide variations in time for concluding the entirety of the path. As a result, each of the time lines defined by each of the physical object 218, and their respective paths and times of travel through the data reading point 706-718 (e.g., the time line represented for a unit of the object 218 by the dotted lines 804, 806, 808, and 810), may be individually computed and considered.

In particular, for example, a total time that may be experienced in transit by a particular one of the units of the physical object 218 may, in the aggregate, exceed certain physical limits associated with the operation of the auto-id node 704. For example, there may be a maximum amount of time allowed to the warehouse environment for processing the physical object 218. In this case, it may be determined that whenever a unit of the physical object 218 requires the high end of its time window that is allowed for movement through its designated path, with respect to, for example, at least half of its expected movements, then a total processing time will be exceeded.

As another example, it may be determined that, in certain instances, a number of units of the physical object 218 will arrive at a particular one of the data reading points within a very small time window. In this case, the data reading point may be physically incapable of reading all of the units of the physical object 218 within the allotted time.

In some implementations, then, some or all of the movement information for the object(s) 218 may be considered to be part of a logical time line, with each movement of each physical object having an associated time slot that corresponds to the range of time allowed for the particular movement. In this way, movement of the object(s) may be stored, tracked, and/or illustrated as advancements through corresponding logical time slots, within the graph 800. The logical time slots may or may not directly relate to exact time measurements (e.g., 20-30 minutes). For example, the time slots may simply define a relative amount of time by a size of the time slot. In this case, a time slot of 2-4 units might correspond to 5-10 minutes in one scenario, 20-40 minutes in another scenario, and some other proportional or related amount in any other scenario.

As a result, the movement graph 800 may be viewed, considered, or otherwise used at particular points in time, or over a progression of time. For example, at a particular time, it may be seen that too many of the object(s) 218 are located at the packing station 714(a), such that the packing stations 714(b) and 714(c) are being used inefficiently.

Although an example of a physical object movement graph is illustrated in FIG. 8, it should be understood that there are other ways of storing and/or accessing the same or similar information. For example, the physical object movement graph may be constructed as a matrix, in which paths between any two data reading points are filled in within the matrix according to probability of movement and an associated time window for movement.

Such a matrix may be impractical for large warehouse environments, where there may be tens, hundreds, or even thousands of the data reading points 706-718. In particular, it may be the case that certain possible movement routes are rarely, if ever, used. For example, it may be the case that the object 218 rarely or never moves from the receiving gate 706b to the packing station 714a, as, for example, the packing station 714b may be much closer. For this reason, such a matrix may be too sparsely filled to be practical way of describing movements of the object 218 through the warehouse environment. Nonetheless, for, for example, relatively small warehouse environments, or environments where each data reading points has an approximately equal chance of movement between any two data reading points, such a representation of the movement graph 800 may be useful. Of course, other representations also may be used.

Figure 9:
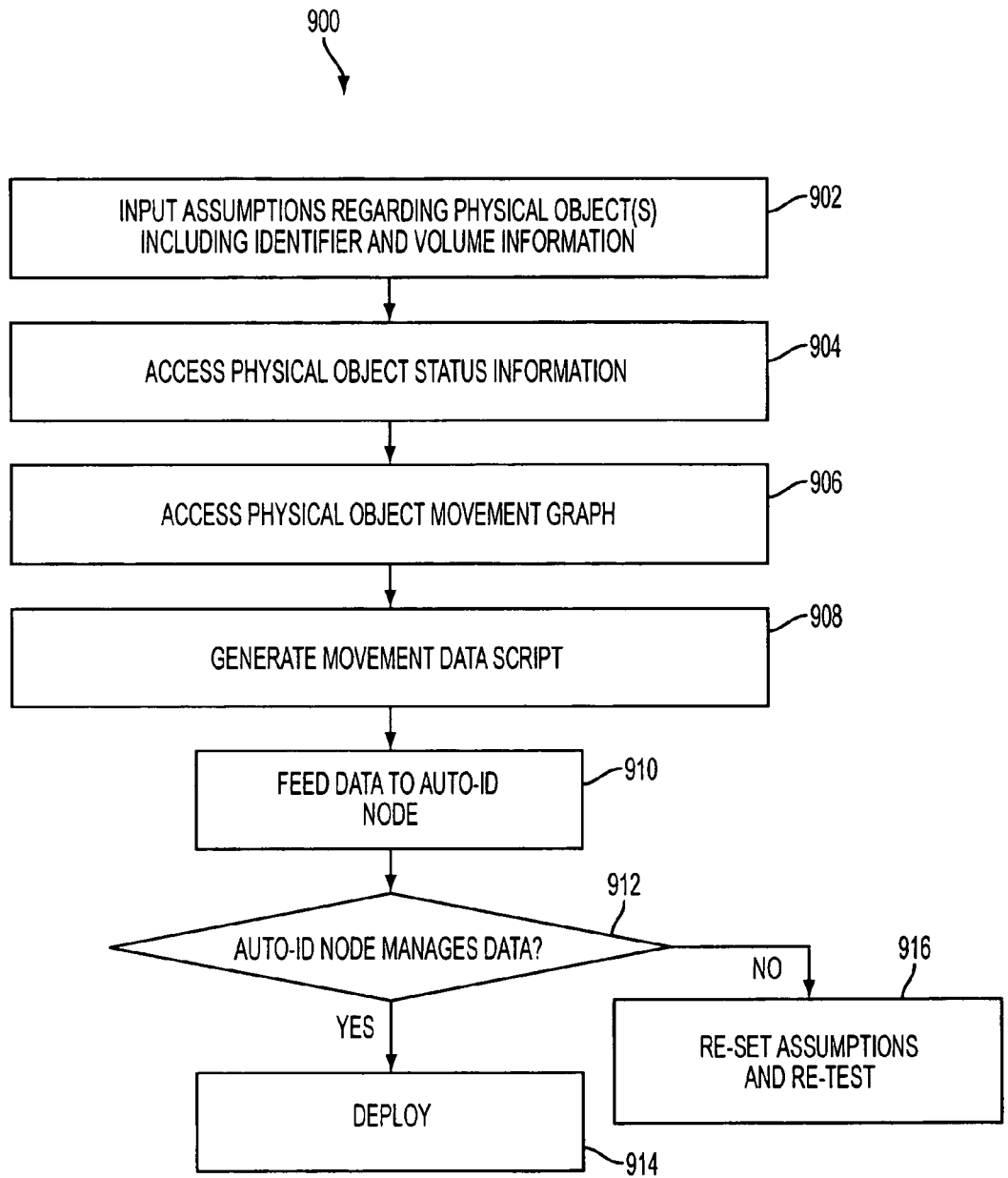
FIG. 9 is a flow chart illustrating a process for using the simulation system of FIG. 7.

FIG. 9 is a flow chart 900 illustrating a process for using the simulation system 700 of FIG. 7. In FIG. 9, the process 900 begins with an input of assumptions or parameters regarding the identification, number, and/or type of physical objects to be simulated, including the volume of physical objects within designated periods of time (902). Such assumptions and/or parameters may be entered using the user interface 722 of FIG. 7.

Based on the assumptions and parameters entered, the simulator 702 accesses physical object status information, by way of, for example, the physical object status data database 724 of FIG. 7 (904). In this way, the simulator 702 is aware of a current location and/or status of the identified (types of) object(s).

Then, the simulator 702 may determine an appropriate physical object movement graph, such as, for example, the graph 800 of FIG. 8, based at least partially on the received assumptions/parameters and/or the physical object status information (906). For example, a first physical object movement graph may be selected for a given type of physical object and a given volume, while a second physical object movement graph may be selected for a different object, or for a different volume of the same object.

Based on criteria determined from the physical object movement graph, and in as described above, the generator 726 generates movement data as a data script (908), that may then be fed to the auto-id node 704 (910). It should be understood that, since a current status (e.g., location) of the relevant object is known, the movement data may be restricted to sub-sets of movement routes through the warehousing environment. For example, in the example above in which an optimal ratio of packing stations 714 to loading stations 716 is determined, the movement data may be generated only with respect to these two data reading points, and/or immediately preceding or succeeding data reading points.

Then, it may be determined whether the auto-id node 704 is capable of managing the received data (912). If so, and in a scenario in which the auto-id node 704 is being tested to determine whether certain volumes and/or types of physical objects may be handled by the auto-id node 704 in a satisfactory manner, then the auto-id node 704 may be deployed for such scenarios (914).

Otherwise, if the auto-id node 704 proves incapable of managing the data in a satisfactory manner, then the various assumptions and parameters that were initially entered may be reset or adjusted, and the scenario test may be conducted once again (916). For example, the auto-id node 704 may begin to show units of the physical object arriving at a wrong location, because a physical limit of a data reading point was reached and an associated read began to malfunction.

Examples have been provided above in which a data script is generated for feeding to the auto-id node 704 for testing and other purposes. That is, such a data script may be used for multiple, rigorous testing of the auto-id node 704. On the other hand, the simulator 702 also may be used simply to experiment with the auto-id node 704, by feeding in various assumptions and viewing the results.

For example, a user interface may be constructed to represent the various features and advantages described above in a visual way. The user interface may illustrate the physical objects as they move through a virtual scenario involving the data reading points, and the user may thus see whether, for example, the object cluster at a particular data reading point.

Although the examples above have been given with respect to a warehousing environment, it should be understood that the simulator 702 may be used with any of the described auto-id nodes, and with other auto-id nodes, such as, for example, retail, supply chain, manufacturing, or distribution auto-id nodes.

Moreover, the simulation techniques are scaleable, and may thus take advantage of the hierarchical nature of the auto-id infrastructure 110 described above in FIGS. 1-3. For example, simulations may be performed across multiple auto-id nodes, or across entire enterprise application, or across entire supply chains. Further, given the hierarchical nature of many packaging schemes (e.g., units within a case, cases within a pallet, pallets within a shipment), simulations may be run across multiple packaging levels, as well.

A number of implementations have been described. Nevertheless, it will be understood that various modifications may be made. Accordingly, other implementations are within the scope of the following claims.

What is claimed is:

1. A computer-implemented method comprising:
   receiving a user selection, through a user interface, of a type and quantity of physical objects that are currently being processed within a process flow of a physical processing environment, for which a virtual movement data is to be generated in order to run a simulation which tests a functionality or a capability of the physical processing environment;
   accessing a movement graph defining, for each of two or more possible destination reading points within the process flow that the physical objects may move to from each origin data reading point, a probability that the physical objects will move to each respective possible destination reading point, and a time window that the physical objects are expected to move from the origin data reading point to each of the two or more possible destination data reading points within the process flow;
   accessing current status information of the user-selected type of physical objects within the physical processing environment wherein the type of physical object is a palletized type, a grouped type, or an individual type;
   generating, based on the selected type of the physical objects, the accessed movement graph, and the accessed current status information, the virtual movement data for the selected quantity of physical objects within the process flow, the virtual movement data specifying a sub-quantity of the physical objects likely to move to, and an expected time of arrival of the specified sub-quantity at, each respective possible destination reading point from the origin data reading point, for input to the origin data reading point or possible destination data reading points wherein the virtual movement data is generated as a simulation model or a testing script;
   inputting at least a portion of the generated virtual movement data to the origin or possible destination data reading points, thereby simulating the virtual movement within the process flow; and
   outputting a representation of the simulated virtual movement to the user through the user interface.

2. The method of claim 1, wherein the status information further comprises one or more origins associated with the selected type of physical objects, one or more destinations associated with the selected type of physical objects, an inventory status associated with the selected type of physical objects, a current location associated with the selected type of physical object, and special banding instructions associated with the selected type of physical object.

3. The method of claim 1, wherein the virtual movement data is formatted in an event message format that is native to the origin data reading point.

4. The method of claim 1, wherein the at least the portion of the generated virtual movement data is input to the origin reading point or the possible destination reading points without placing the origin reading point or the destination reading point into a simulation mode, and without physically moving the physical objects from the origin reading, point to the possible destination reading points.

5. The method of claim 1, wherein the representation comprises a return on investment analysis of the origin or destination data reading points.

6. The method of claim 1, further comprising automatically selecting the movement graph based on the selected type and quantity of the physical objects.

7. The method of claim 1, wherein the virtual movement represents a progression of the selected type of the physical objects through the origin and possible destination data reading points.

8. The method of claim 1, wherein accessing the current status information further comprises determining a current location for the selected quantity of the selected type of the physical objects.

9. The method of claim 1, generating the virtual movement data further comprises:
   determining a selected destination data reading point from amongst the two or more possible destination data reading points based on the accessed status information and the probability; and
   determining a random time within the time window associated with the selected destination data reading point.

10. The method of claim 1, further comprising determining that a total processing time will be exceeded if of the selected type of the physical requires a high end of the time window for greater than a predetermined threshold of virtual movements.

11. The method of claim 1, further comprising constructing the movement graph as a matrix, in which paths between the origin data reading point and the possible destination data reading points are filled in according to the probability and the time window associated with each of the possible destination data reading points.

12. The method of claim 1, further comprising determining appropriate physical objects for which to generate virtual movement data, based on the selected quantity and the accessed current status information.

13. The method of claim 1, further comprising receiving a second user selection through the user interface, the second user selection adjusting the probability and the time window.

14. The method of claim 13, further comprising regenerating the virtual movement data based on the adjusted probability and the adjusted time window.

15. The method of claim 1, wherein the origin data reading point is associated with a radio frequency identification device (RFID) reader.

16. The method of claim 1, wherein the representation comprises an illustration of the type of the physical objects moving through the process flow.

* * * * *